G. EVERSON.
LIQUID GAGE.
APPLICATION FILED FEB. 15, 1910.
964,960.
Patented July 19, 1910.
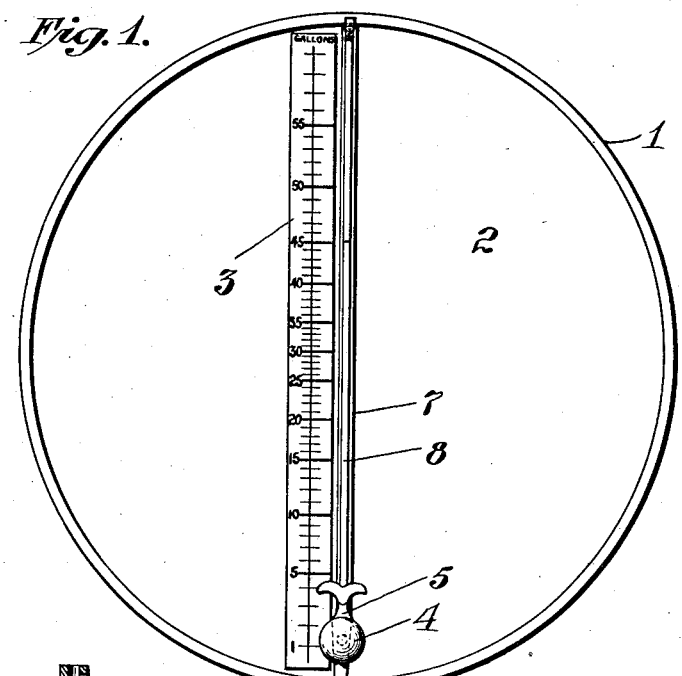
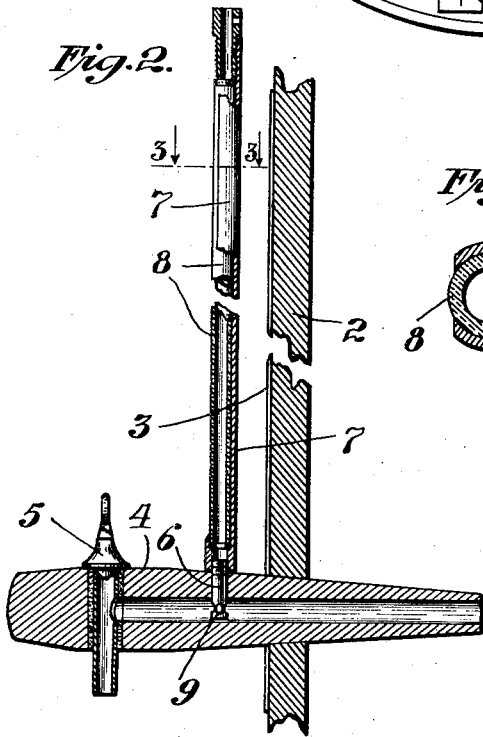
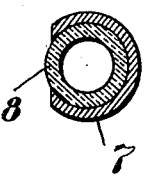
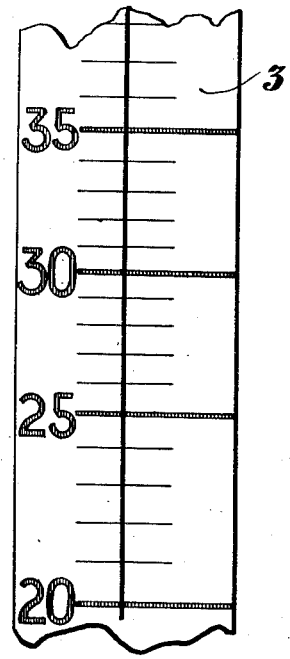
Attest:
Inventor:
George Everson
by
his Atty

UNITED STATES PATENT OFFICE.

GEORGE EVERSON, OF NEW YORK, N. Y.

LIQUID-GAGE.

964,960.  Specification of Letters Patent.  Patented July 19, 1910.

Application filed February 15, 1910. Serial No. 543,941.

*To all whom it may concern:*

Be it known that I, GEORGE EVERSON, a citizen of the United States of America, residing at 364 Greene avenue, Brooklyn, New York city, in the county of Kings and State of New York, have invented certain new and useful Improvements in Liquid-Gages, of which the following is a specification.

My invention relates to an improved liquid gage and is especially adapted to indicate the quantity of liquid in a receptacle at any given time.

In liquid gages as heretofore employed, it was customary to provide the gage tube which is usually made of glass with graduation marks. This arrangement has several disadvantages. These liquid gages are frequently employed in dark rooms such as cellars, where the marks on the glass are hardly discernible without the use of artificial light, thus making it difficult to ascertain what the contents of a receptacle are. A further disadvantage lies in the fact that the receptacles for the liquid are of varying sizes, and as a consequence it is necessary to provide practically as many gages as there are sizes of containers or receptacles.

It is the object of my invention to obviate the disadvantages inhering in present constructions and to provide a simple liquid gage which is inexpensive to manufacture and by the use of which the level of the contents in a container may be quickly and accurately determined.

The invention consists, substantially, in providing a strip of suitable material such as paper with graduations, and a separate liquid gage juxtaposed to the strip, whereby the level of the liquid in the gage may be compared with the graduations on the strip to show readily the height of the contents in the container. By my invention it is possible to provide each receptacle with a separate strip, such strip being preferably provided with adhesive on its back whereby the strip may be pasted to the container. The tube or glass gage is preferably associated with the spigot or faucet which is driven into the container and one size of liquid gage will answer for any number of sizes of containers.

The preferred embodiment of the invention as applied to a wine cask is illustrated in the accompanying drawing, wherein—

Figure 1 is an end elevation of a wine cask having my invention applied thereto; Fig. 2 is a vertical sectional view through the same. Fig. 3 is a horizontal sectional view on the line 3—3 of Fig. 2; and Fig. 4 is a fragmentary view of the strip provided with graduations.

Referring in detail to the drawings, 1 designates the cask to the head 2 of which the strip 3 is applied preferably by being pasted thereto. The strip 3 is provided with graduations ranging from a predetermined minimum to a predetermined maximum.

Wine casks such as that shown in the drawing are usually bellied and when the liquid therein is on a level with about the center of the barrel, a predetermined quantity of liquid will be spread over a greater surface than at any other point in the barrel. For this reason the graduations on the strip 3 are so proportioned that at the upper and lower ends of the strip the graduations are spaced widest, while at the middle of the strip the distance between the graduations is less, there being a constant decrease in width between the graduations from the top to the center and from the bottom to the center.

The faucet or spigot which is adapted to be driven in the cask 1 is designated 4 and is provided with the usual tap 5. Passing through a bore in the spigot is a nipple 6 threaded into the metallic sleeve 7 of the gage glass 8. This gage glass is preferably arranged to one side of the graduated strip 3 so that the liquid level in the gage glass may be readily read off on the graduations, as shown in Fig. 1 for example, where the liquid level stands at 45. The nipple 6 is provided with one or more orifices 9 through which liquid passes from the cask 1 up into the glass tube 8. At its upper part the glass tube is in communication with the atmosphere. The diameter of the glass tube is preferably sufficiently great to permit of the passage therethrough of any instrument which it may be desired to use to measure the specific gravity or the alcoholic contents of the liquid in the cask. The instruments most usually employed in this connection are alcohol meters which either are or can be made sufficiently small so that the diameter of the glass tube 8 need not be unduly large. It is also to be noted that as shown in Fig. 3, the preferred construction of the glass gage is a telescoping one wherein the glass tube 8 is partially inclosed by the brass sleeve 7 and the nipple 6 threads into the lower end of the sleeve.

In Fig. 4 wherein a fragment of the graduated strip is shown, it will be noted that certain quantities are indicated in red as shown by conventional shading while intermediate quantities are indicated in black. It is preferred to thus show graduations in contrasting colors to more easily read off those quantities which are indicated by figures in groups of five.

Having thus described my said invention, what I claim as new and desire to secure by Letters Patent is:—

In a device of the character described, the combination with a receptacle, of a strip pasted thereto and having one of its surfaces provided with graduation marks whereof the principal marks are shown in red, a faucet adapted to be driven into said receptacle and having a tap near its forward end, and a glass tube having a nipple of less diameter than the tube itself in communication with the faucet in the rear of the tap, said glass tube, being arranged at one side of and parallel with the strip whereby the level of the contents in the receptacle is indicated in the glass tube and may be read off on the graduations on said strip.

In testimony whereof I have affixed my signature in presence of two witnesses.

GEORGE EVERSON.

Witnesses:
 HAROLD MITCHELL,
 MARGARET McQUAID.